United States Patent [19]
Slutz et al.

[11] Patent Number: 5,106,392
[45] Date of Patent: Apr. 21, 1992

[54] MULTIGRAIN ABRASIVE PARTICLES

[75] Inventors: David E. Slutz, Columbus; Francis R. Corrigan, Westerville, both of Ohio

[73] Assignee: General Electric Company, Worthington, Ohio

[21] Appl. No.: 669,124

[22] Filed: Mar. 14, 1991

[51] Int. Cl.⁵ .............................................. B24D 11/00
[52] U.S. Cl. ........................................ 51/295; 51/293; 51/298; 51/308; 51/309
[58] Field of Search ................. 51/293, 295, 298, 308, 51/309

[56] References Cited

U.S. PATENT DOCUMENTS

| | | | |
|---|---|---|---|
| 4,441,894 | 4/1984 | Sarin et al. | 51/295 |
| 4,671,021 | 6/1987 | Takahashi et al. | 51/293 |
| 4,690,691 | 9/1987 | Komanduri | 51/293 |
| 4,738,689 | 4/1988 | Gigl et al. | 51/293 |
| 4,919,974 | 4/1990 | McCune et al. | 51/293 |

*Primary Examiner*—William R. Dixon, Jr.
*Assistant Examiner*—Willie J. Thompson
*Attorney, Agent, or Firm*—Millen, White & Zelano

[57] ABSTRACT

Multigrain abrasive particles and articles made therefrom are provided wherein the particles comprise fine granules of cubic boron nitride or diamond bound by a sintered matrix of one or more layers of active coating material that is chemically bonded to the underlying surface. These particles are obtained by sintering the coated granules under relatively mild conditions in comparison to those necessary to form monocrystalline abrasive particles of a similar size. In certain embodiments, the use of high pressure, high temperature equipment can be avoided. The particles have improved breakdown characteristics which can be controlled through a selection of the coating thickness, the type of coating and the size of the fine granules to be bonded. The process is well suited for the use of diamond powder produced from chemical vapor deposition processes.

23 Claims, No Drawings

MULTIGRAIN ABRASIVE PARTICLES

CROSS-REFERENCE TO RELATED APPLICATIONS

This application is related to co-pending application Ser. No. 07/669,259, entitled "Products and Process for Making Multigrain Abrasive Compacts," assigned to the same assignee as the present invention and filed concurrently herewith and which entire disclosure is incorporated by reference herewith.

BACKGROUND OF THE INVENTION

In the manufacture and use of abrasive and cutting tools such as grinding wheels, drill bits and saw blades, cubic boron nitride and diamond have been recognized as excellent abrasive materials. Their dense crystalline structure and strong covalent bonds provide high hardness, high abrasion and advantageous breakdown characteristics when used in grinding and cutting applications. These materials are also excellent thermal conductors and efficiently transfer heat generated during cutting and grinding operations from a tool's cutting edge. Cubic boron nitride and diamond are often used in the form of sized particles bonded by a resin or metal matrix in tools such as, for example, grinding wheels. They are also used as clusters of crystals bonded together, with or without the aid of a bonding medium, in the form of a solid mass or compact. This compact can be affixed to a cutting tool or formed directly on a substrate.

To be effective in grinding tool applications, the particles must be of a size sufficiently large to protrude from the cutting surface of the tool intended. Obtaining suitably sized particles is difficult. Cubic boron nitride (CBN) and industrial diamonds are synthesized from materials of an alternate crystalline structure, i.e., hexagonal boron nitride and graphite, respectively. These materials are made under conditions of high pressure and high temperature, with or without the aid of a catalyst. See U.S. Pat. Nos. 4,289,503; 4,188,194; and 3,918,219. Polycrystalline particles of a desired size can be obtained by a direct conversion process using starting materials (HBN) of a similar but larger size under conditions of high temperature and pressure. Alternatively, large polycrystalline masses can be formed from diamond or CBN powders with the aid of a catalyst under conditions of high temperature and pressure for periods in excess of 15 minutes and as long as one hour. These polycrystalline masses are then milled to particles of a desired mesh size.

Copending application Ser. No. 07/365,883, entitled "Process for Making Cubic Boron Nitride from Coated Hexagonal Boron Nitride and Abrasive Particles and Articles Made Therefrom", filed June 14, 1989, and assigned to the same assignee as the present invention, describes a method wherein hexagonal boron nitride particles are coated with a layer that prevents oxide contamination prior to conversion to polycrystalline CBN. The protective layer is bonded chemically within the resultant polycrystalline CBN in the form of a compact. This compact can be milled to abrasive particles of a desired size with controlled breakdown characteristics. However, this process utilizes high temperatures and pressures for converting the HBN. Furthermore, while application Ser. No. 07/365,883 discloses that the CBN abrasive particles obtained can be sintered into another multigrain mass, some of the original coating is said to be lost in breaking up the CBN compact.

Making abrasive particles of a desired size by prior art techniques is costly in that they require significant expenditures of energy and place considerable demands on high pressure equipment due to their long cycle times. It is desirable to shorten the cycle times necessary to form suitably sized abrasive particles and it is also desirable to operate at lower temperatures and pressures.

A method for producing aggregate abrasive grains is described in U.S. Pat. No. 4,024,675, wherein a mixture of abrasive powders, sinterable metal alloy powders (Ca, Sn, Ni, Co, Fe) and an adhesion active agent (catalyst) are sintered to produce a porous cake with voids which is subsequently crushed to form abrasive particles of a desired size. While this process does not utilize high pressures and temperatures for extended periods of time, the particles produced do not exhibit high toughness and thermal stability since the metal alloys are not coated and bonded to the abrasive. In addition, manipulating the breakdown characteristics of the resultant particles is not described and may not be possible.

As can be seen from the foregoing, it would be advantageous to form tough, thermally resistant abrasive particles of CBN and diamond by techniques which utilize high pressure/high temperature equipment more efficiently or do not require such an apparatus at all. It would be particularly advantageous to provide such multigrain abrasive particles without the use of a catalyst (adhesive active agent) when sintering techniques are used. It would also be advantageous to produce multigrain abrasive particles with controlled breakdown characteristics by methods which do not require long exposure to high temperatures and pressures.

Various metals and alloys of metals are known to enhance the bond retention of abrasive particles in the matrices of abrasive tools such as grinding wheels and similar agglomerated aggregates. For example, coatings of nickel are applied to abrasive particles used in grinding wheels or similar aggregates bonded with a resin or metal matrix. Suitable coating techniques known in the art include electrolytic deposition, electroless deposition, sputtering, vacuum deposition and heat treatment of a metal/particle mixture. See, Pipkin, U.S. Pat. No. 4,399,167. Until now, coated granules and powders have not been used efficiently to provide abrasive particles of a larger size with high toughness and thermal resistance.

SUMMARY OF THE INVENTION

Accordingly, it is an object of this invention to provide an improved process for the production of multigrain abrasive particles which does not require long cycle times in a high pressure/high temperature apparatus.

Another object of the present invention is to provide an improved process for the production of multigrain abrasive particles which utilizes lower pressures and temperatures.

Another object of the present invention is to provide multigrain abrasive particles comprising a sintered mass or aggregate of fine abrasive granules coated with a material that chemically bonds to the underlying surface.

Still another object of the present invention is to provide multigrain abrasive particles having controlled breakdown characteristics.

Another object of this invention is to provide cubic boron nitride and diamond multigrain particles which can be formed outside of a high pressure, high temperature apparatus.

In another aspect, it is an object of the present invention to provide a method for producing multigrain abrasive particles from fine diamond granules and/or powders produced by chemical vapor deposition techniques and the abrasive particles obtained therefrom.

Another object of the present invention is to provide compacts and articles which incorporate the multigrain abrasive particles of this invention.

Upon further study of the specification and appended claims, further objects and advantages of this invention will become apparent to those skilled in the art.

In accordance with the present invention, there is provided a process for producing multigrain abrasive particles which comprises applying to fine grains of cubic boron nitride or diamond at least one layer of an active coating material which chemically bonds to the underlying surface, wherein the outer layer on the fine granules is sinterable. The coated granules are sintered to form a multigrain mass and this mass is converted to particles of a desired size. From one to three layers of active coating material are preferably applied by chemical vapor deposition techniques. This process is well suited for producing abrasive particles from diamond powder produced by chemical vapor deposition techniques. Within the embodiments of this process are methods for producing abrasive particles having controlled breakdown characteristics wherein the size of the fine granules, the coating thickness and composition are selected to determine the intergranular bonding strength of the resultant particles. Also within the embodiments of the process of this invention are methods for producing multigrain abrasive particles of a desired size which require less than ten minutes within a high pressure/high temperature apparatus.

There is also provided by this invention multigrain abrasive particles of a size 1-1,000 micron in diameter which comprise sintered masses of fine granules of cubic boron nitride or diamond bonded by a sintered matrix derived from one or more layers of active coating material. The outer layer of coating material on these granules is sinterable. The active coating material is preferably titanium nitride or titanium carbide which chemically bonds to the surface of the fine granules. In some embodiments, the breakdown characteristics (intergranular bonding strength) of the particles is predetermined for the desired end use. Included within the abrasive particles provided by this invention are those obtained from fine diamond powders produced by chemical vapor deposition techniques.

Abrasive compact structures and tools which incorporate the abrasive particles of this invention are also provided. The compacts preferably comprise a sintered metal matrix and multigrain abrasive particles of cubic boron nitride or diamond granules bound by a sintered active coating material.

DETAILED DESCRIPTION OF PREFERRED EMBODIMENT

The size and form of the fine abrasive granules used in the process of this invention can vary widely. Submicron size granules or powders are suitable, i.e., about 0.1 micron in diameter. Granules as large as 1,000 micron in diameter are also suitable. Granules and powders that are too small will result in excessive dilution of the abrasive within the resultant particle when the active coating material is applied, rendering the particle ineffective for use in abrasive and cutting tools. Too large a granule provides little advantage from this process since such granules may already be of a size suitable for use. Preferably, the granules are of a size in the range of 0.25 micron to 200 micron. The process of this invention is well suited for providing multigrain particles comprised of fine granules and/or powder of diamond produced by chemical vapor deposition processes. These powders are typically too small to be utilized without conversion to large monocrystalline masses at high temperatures and pressures with the aid of a catalyst.

Suitable fine abrasive granules include natural and synthetic diamond, such as diamond produced by chemical vapor deposition processes. Also included are cubic boron nitride granules made from hexagonal boron nitride with a catalyst as disclosed in U.S. Pat. No. 2,947,617 or without a catalyst as disclosed in U.S. Pat. Nos. 3,212,852 and 4,289,503. The cubic boron nitride can be produced from both types of hexagonal boron nitride, i.e., pyrolytic boron nitride and graphitic boron nitride. Methods as described in U.S. Pat. No. 4,188,194 are suitable. The term "cubic boron nitride", as used herein, is intended to include the hard Wurtzitic (hexagonal) form of boron nitride (WBN). Preferably, the fine granules used are obtained directly from a conversion process; however, it is within the scope of this invention to utilize granules obtained from milling or pulverizing a compact mass of CBN or diamond. It may be desirable to utilize the fine particles generated as byproducts when pulverizing or milling such masses to be used in other tools.

Although not critical, it is preferable for the granules to be subjected to a pretreatment process, such as vacuum firing, to remove surface impurities including oxides, moisture and/or other volatiles. Prior to this vacuum firing, it is also preferable to remove metallic and/or organic impurities by conventional washing techniques with acid solutions followed by a deionized water wash.

Although it is not practical to remove all of the oxides and/or other impurities from the abrasive granules by the conventional techniques discussed herein and others known in the art, a sufficient amount of the oxides and/or other impurities are preferably removed to provide granules which are substantially free of oxides and other contaminants, i.e., having a sufficiently low oxide and contaminant content to permit coating with an active coating material. As used herein, the phrase "substantially oxide free" refers to granules having a reduced amount of oxide and/or other contaminants so that a coating of active coating material can be applied with high bond strength. Generally, in preferred embodiments of the present invention, up to about 90%, and more preferably, about 90-98% by weight of the oxides and other volatile contaminants or impurities are removed from the granules in the pretreatment steps to form substantially oxide-free granules. Removal of the metallic and/or organic contaminants can be accomplished by conventional techniques. Vacuum firing of the granules can be performed as described in U.S. Pat. No. 4,289,503 which describes vacuum and temperature conditions needed for removing volatile impurities from HBN particles, including oxide contaminants. It is not necessary to fire the granules at the thermal decomposition temperature to remove the oxides.

In accordance with the process of this invention, fine granules of cubic boron nitride or diamond, preferably free of oxides and impurities, are coated with at least one layer of an active coating material which chemically bonds with the underlying surface. The first layer is an active material which bonds chemically to the surface of the abrasive granules. Subsequent layers must bond to the underlying coatings.

Preferably, the first coating is applied in the same apparatus used to remove the oxide and other volatile contaminants from the granules such as when applying the active coating material by chemical vapor deposition techniques. Volatile impurities, including oxides, can be removed from the surfaces of the granules within the CVD chamber as disclosed in U.S. Patent No. 4,289,503.

Alternative methods for applying the active coating material include other vacuum deposition processes, electrolytic processes and/or electroless processes which are well known in the art. One skilled in the art will be able to determine the process and conditions necessary for forming a particular coating in a manner in which the material chemically bonds with the underlying surface. Chemical vapor deposition techniques are preferred in that substantially uniform coatings are obtained on a substrate by chemically reacting gaseous materials on the surfaces of the substrate (granules). One or more layers of an active coating material can be applied with each layer chemically bonded to the underlying surface.

The active coating material may be any metal or alloy which chemically bonds with the surface of the abrasive granule or a coating thereon when applied. Preferred metals include titanium, zirconium, hafnium, cobalt, vanadium, niobium, tantalum, silicon, copper, chromium, nickel, molybdenum, tungsten, and the like or mixtures thereof. The borides, nitrides, carbides and oxides of these various metals are also suitable. Examples of the preferred species in this class include the borides, nitrides and carbides of titanium, zirconium, hafnium, vanadium, niobium, tantalum, molybdenum, chromium, tungsten, and silicon. Particularly preferred active coating materials include titanium carbide, titanium nitride and tungsten.

The coating thickness and/or the amount of active coating material applied to the fine granules is not critical; however, it is undesirable for the coating materials to be used in amounts which excessively dilute the abrasive granules in the resultant particles so that they are ineffective when used in abrasive or cutting tools. Uniform coatings of a minimal thickness, i.e., less than 0.01 micron are suitable. Preferably, the total coating thickness ranges from 0.01 to 5.0 micron. Most preferably, the total coating thickness ranges from 0.1 to 1.0 micron. The thickness of the one or more layers of active coating material may be varied in accordance with the process of this invention to alter and control the intergranular bonding, which is related to the particle breakdown characteristics of the resultant abrasive particle. In most instances, the greater the total thickness of the active coating material, the less the intergranular bonding strength is between the fine granules. One skilled in the art can easily determine suitable and preferred active coating materials, granule sizes and total coating thicknesses for the end use intended by routine investigations.

The coating process used to apply the layer of active coating material or bonding agent is dependent on the coating applied. The coating method will vary as to whether the coating is a metal boride, metal carbide, metal nitride, metal oxide or a metal. Certain coatings are best suited for application by chemical vapor deposition, such as the metal carbides. Coating methods for these other materials are conventional and one skilled in the art will recognize the appropriate technique and conditions for the coating desired. A method of coating the abrasive granules is described in U.S. Pat. No. 4,399,167, wherein the abrasive granules are heated in the presence of a metal powder in a substantially oxide-free state. The heat treatment takes place at a temperature below the melting point of the metal so that minimal sintering of the metal occurs. As a general rule, the heat treatment is less than 60 minutes in duration and the coating thickness does not exceed a few microns and is typically less than 5 micron and preferably from 0.5 to 1.0 micron.

The outer layer of active coating material on the fine abrasive granules of the cubic boron nitride or diamond is sinterable. This sinterable material can be the only coating applied to the fine granules or it can be one of many separate layers. The sinterable coating can be applied by the same techniques as those given above for the active coating materials, i.e., by electroless deposition, electrolytic deposition, vacuum deposition and chemical vapor deposition. Suitable sinterable materials include nickel, cobalt, copper, and the borides, nitrides and carbides of titanium, tantalum, molybdenum, zirconium, hafnium, tungsten, vanadium, chromium, niobium and silicon.

In preferred embodiments, the abrasive granules are coated with active coating materials by chemical vapor deposition (CVD) and more preferably by low pressure chemical vapor deposition (LPCVD) techniques. Such methods are well known in the art, particularly for metal carbides, borides, nitrides and oxides, particularly for the preferred metals referred to above, especially titanium. Titanium carbide coatings are derived from titanium tetrachloride and methane gas by chemical vapor deposition at reduced pressure and elevated temperature (LPCVD). Titanium nitride coatings are derived from a nitrogen gas and titanium tetrachloride maintained at temperature and pressure sufficient to form titanium nitride on the granules during CVD processing. Titanium nitride coatings can also be obtained wherein the nitride is derived from the boron nitride on the surface of the CBN particles. To deposit tungsten nitrides and carbides, $WF_6$, or $WCl_5$ is used in place of titanium tetrachloride. Typical CVD and LPCVD processes, systems and devices are described in *Kirk-Othmer Encyclopedia of Chemical Technology*, Vol. 15, pp. 262-264 (1981).

Electrolytic and electroless depositing techniques and systems are also suitable and are described by *Kirk-Othmer Encyclopedia of Chemical Technology*, Vol. 15, pp. 241-274 (1981).

After the abrasive granules are coated with at least one active coating material and have a sinterable outer coating, they may be stored for subsequent use or they can be used immediately in a sintering process to form a multigrain mass of abrasive granules bonded together with the sintered outer coating thereon.

This multigrain mass can be milled to particles of any size. Particle sizes ranging from 1 micron to about 1,000 micron in diameter are preferred and more preferably, the mass is converted to particles of sizes ranging from 10 micron to about 200 micron in diameter. When the mass is milled, the particles comprise fine CBN aggregate or sintered mass. In preferred embodiments, these particles will have breakdown characteristics as determined by the size of the granules therein, the active coating material used and the thickness of this coating.

An alternative to milling the multigrain masses is to produce abrasive particles of a desired size directly upon sintering the coated granules using appropriate sintering barriers such as screens. This is particularly useful when sintering outside of a high pressure, high temperature apparatus.

The coated particles can be sintered by conventional techniques. Preferably, at pressures below 50 kbar and most preferably about 2000 psi where temperatures about 1,500° C. are used. Sintering can take place in a high pressure, high temperature apparatus. The cycle time with this equipment is short in duration, i.e., less than 10 minutes, and is significantly shorter than the time required to form monocrystalline abrasive particles. Preferably, this sintering is performed in less than 5 minutes, although the sintering process is not critical to this invention. Most preferably, sintering takes place in less than about 3 minutes. The shorter the cycle times, the more economical and efficient the process.

Preferred temperatures and pressures vary with the coatings on the abrasive particles. Coating materials can be selected so that high pressure/high temperature dies or presses need not be used to sinter the coated granules. Those skilled in the art will recognize the appropriate sintering temperatures for the coating selected and the appropriate pressures necessary. Generally, temperatures in the range of 750° C. to 2,000° C. are adequate with pressures ranging from 0.1 to 50 kbar. To sinter coatings of nickel, titanium nitride and titanium carbide, pressures of about 2,000 psi (0.14 kbar) and temperatures of 1,000° C. are satisfactory, which can be obtained outside of a high pressure, high temperature apparatus. The phrase "sintering" or "sinterable" as used herein is meant the agglomeration or the ability to agglomerate metal or other protective coatings on the abrasive granules at temperatures below the melting point of the active coating material, which can easily be determined by one skilled in the art.

The multigrain abrasive particles obtained by this invention can be formed into an article of any desired shape, for example, a cutting or grinding tool, with the aid of a resin or metal bonding matrix. Alternatively, the abrasive particles can be utilized to form compacts by mixing them with a sinterable metal powder or alloy and sintering the mixture to provide a "compact". The weight ratio of powdered metal or alloy to particles can range from 10:1 to 0.1:1. Suitable metals and alloys include nickel, cobalt, copper, tungsten and tungsten carbide. The compact mass can be integrated, e.g., brazed, into the cutting surfaces of tools such as saw blades and drill bits. These tools will have improved wear and breakdown characteristics in use as provided by the multigrain abrasive particles incorporated therein. Conventional methods can be used in forming these cutting and grinding tools and the compacts described above. Conventional methods can also be used to form composite compacts with the multigrain abrasive particles of this invention. To do so, the particles are typically mixed with a sinterable material and sintered onto a substrate to form the desired article.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth in degrees Celsius and unless otherwise indicated, all parts and percentages are by weight.

The entire disclosures of all applications, patents and publications identified herein are hereby incorporated by reference.

EXAMPLE

Example 1

About 50 g of 18/20 mesh cubic boron nitride 550 is inserted into a LPCVD apparatus. The system is evacuated below about 1 Torr and then scrubbed by flowing hydrogen gas through the system. While under vacuum, the temperature of the CBN is raised to about 1000° C. to remove boron oxides and other volatile contaminants prior to coating. The particles are coated with titanium carbide by flowing separate streams of hydrogen, methane and a mixture of titanium tetrachloride and hydrogen gases through the system for approximately 2 hours at 1000° C. and about 10 Torr. The flow rate for the titanium tetrachloride, total hydrogen and methane gases is 100 SCC or 600 SCCM and 300 SCCM, respectively. After cooling under vacuum, the CBN particles are removed from the apparatus and inspected for a gray/black appearance which indicates a titanium carbide coating of the particles has been obtained. This can be confirmed by X-ray diffraction techniques. By measuring the increase in weight of the coated particles, the coating thickness is calculated to be about 0.6 microns.

A sample of the 18/20 mesh CBN 550 coated with titanium carbide is then overcoated with nickel to about 30 micron thickness by electroplating in a bath of WATTS solution (Ni sulfate/Ni chloride) for 1200 amp minutes.

Example 2

About 50 g of 40/50 mesh CBN 550 is successfully coated with titanium carbide by LPCVD to about 0.4 micron thickness using the equipment and procedure described in Example 1. Successful coating is evidenced by a gray/black color of the CBN particles.

Example 3

About 20.5 g of 270/325 mesh CBN 550 is coated with titanium carbide by LPCVD using the equipment and procedure described in Example 1, except that the flow rates for the hydrogen stream, methane stream and titanium tetrachloride/hydrogen stream are each 300 SCCM; respectively. Successful coating is evidenced by a gray/black color of the CBN particles.

Samples of the coated CBN are successfully sintered into a multigrain mass in a high pressure, high temperature press at a pressure of 50 kilobars and temperature of 1500° C. This compact mass is subsequently hand impact milled to form multigrain mesh size particles ranging in size from 1000 to less than 30 microns.

The preceding examples can be repeated with similar success by substituting the generically or specifically described granules, reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A separate multigrain abrasive particle of a diameter in the range of 1 to 1000 micron which comprises cubic boron nitride or diamond granules bonded together in a sintered matrix derived from a coating on the granules which comprises one or more layers of active coating material chemically bonded to the underlying surface of the granules.

2. A separate multigrain abrasive particle as in claim 1, wherein one to three layers of the active coating material are applied to the granules by chemical vapor deposition, electrolytic deposition and/or electroless deposition.

3. A separate multigrain abrasive particle as in claim 1, wherein at least one layer of active coating material is titanium, zirconium, hafnium, vanadium, niobium, tantalum, chromium, molybdenum, tungsten, silicon, or a carbide, boride, nitride or oxide thereof.

4. A separate multigrain abrasive particle as in claim 1, wherein the other layer active coating is nickel, cobalt, copper or a carbide or nitride of titanium, tantalum, molybdenum, zirconium, vanadium, chromium, niobium, tungsten, hafnium or silicon.

5. A separate multigrain abrasive particle as in claim 1, with at least two layers of active coating material wherein the total thickness of active coating material on the granules is from 0.01 to 5.0 micron.

6. An abrasive compact structure comprising multigrain abrasive particles of claim 1, bonded by a sintered powdered metal or alloy under sintering conditions, wherein the weight ratio of multigrain abrasive particles to the powdered metal or alloy is from 10:1 to 0.1:1.

7. An abrasive tool comprising the multigrain abrasive particles of claim 1 bound within a resin matrix or a sintered metal matrix.

8. A multigrain abrasive particle which comprises diamond powder, produced by a chemical vapor deposition process, bonded together in a sintered metal matrix derived from a coating on the diamond powder, said coating comprising one or more layers of active coating material chemically bonded to the underlying surface of the granules.

9. A multigrain abrasive particle with controlled breakdown characteristics which comprises cubic boron nitride or diamond granules of a size selected from within the range of 1 to 1000 micron in diameter, which are bonded together in a sintered matrix derived from a coating on the granules which comprises one or more layers of an active coating material at a total thickness within the range of 0.01 to 5.0 micron, wherein said active coating material is selected from titanium, zirconium, hafnium, vanadium, niobium, tantalum, tungsten, chromium, molybdenum, silicon, nickel, cobalt, copper, or a carbide, boride, nitride or oxide thereof.

10. A process for the production of multigrain abrasive particles which comprises applying to fine granules of cubic boron nitride or diamond at least one layer of an active coating material which chemically bonds to the underlying surface, wherein the outer layer of active coating material on the granules is sinterable, sintering the coated granules to provide a multigrain mass and converting the multigrain mass to particles of a desired size.

11. A process as in claim 10, wherein 1-3 layers of active coating material are applied to the granules by chemical vapor deposition, electrolytic deposition and/or electroless deposition.

12. A process as in claim 10, wherein at least one layer of active coating material is titanium, zirconium, hafnium, vanadium, niobium, tantalum, chromium, molybdenum, nickel, silicon, cobalt, copper, tungsten, or a carbide, boride, nitride or oxide thereof.

13. A process as in claim 10, wherein one layer of active coating material is titanium nitride or titanium carbide, applied by chemical vapor deposition, and the outer layer of active coating material is nickel, applied by electrolytic deposition.

14. A process as in claim 10, wherein more than one layer of active coating material is applied to the granules and is sinterable at pressures below 50 kbar and temperatures about 1000° C.

15. A process as in claim 10, wherein the sinterable outer coating of active coating material is nickel, or a carbide or nitride of titanium, tantalum, molybdenum, zirconium, vanadium, chromium, niobium, hafnium, tungsten, or silicon.

16. A process as in claim 10, wherein the fine granules of cubic boron nitride or diamond are of a size within the range of 0.1 to 1000 micron.

17. A process according to claim 10, wherein the active coating material is applied to the fine granules at a total thickness of from about 0.01 to 5.0 micron.

18. A process as in claim 10, wherein the multigrain mass is converted to particles of a size within the range of 1 to 1000 micron in diameter.

19. A process as in claim 10, wherein the coated granules are sintered to particles of the size within the range of 1 to 1000 micron directly without pulverizing or milling the masses produced.

20. A process as in claim 10, wherein the granules of cubic boron nitride or diamond are sintered without the use of a catalyst at a pressure in the range of 0.1 to 50 kilobars and a temperature below 2000° C. for a period of less than 10 minutes.

21. A process for the production of multigrain abrasive particles having controlled breakdown characteristics which comprises selecting fine granules of cubic boron nitride or diamond of a diameter within the range of 0.1 to 200 microns, applying at least two layers of active coating material selected from titanium, zirconium, hafnium, vanadium, niobium, tantalum, chromium, molybdenum, nickel, tungsten, silicon, coblt, copper or a carbide, boride, nitride or oxide thereof, at a total thickness in the range of 0.1 to 1.0 micron, wherein the outer layer is a sinterable material selected from nickel, copper, cobalt or a carbide or nitride of titanium, tantalum, molybdenum, zirconium, tungsten, silicon, hafnium, vanadium, chromium or niobium; sintering the coated granules at a temperature about 1000° C. and a pressure about 2000 psi for less than 5 minutes to provide a multigrain mass and converting this multigrain mass to multigrain particles of a size within the range of 1 to 1000 microns in diameter.

22. A process as in claim 21, wherein the sintering step is performed outside of a high pressure, high temperature apparatus.

23. A process for the production of multigrain particles which comprises applying to diamond powder formed by a chemical vapor deposition (CVD) process, at least one layer of an active coating material that chemically bonds to the underlying surface, wherein the outer layer of active coating material is sinterable, sintering the coated CVD diamond powder to provide a multigrain mass and converting the multigrain mass to particles of a desired size.

* * * * *